United States Patent [19]

Booth et al.

[11] Patent Number: 4,891,619

[45] Date of Patent: Jan. 2, 1990

[54] ELECTROMAGNETIC COUPLING DISC

[75] Inventors: Dwight E. Booth, Janesville; Gerry N. Lippincott, Milton, both of Wis.

[73] Assignee: Dana Corporation, Toledo, Ohio

[21] Appl. No.: 261,112

[22] Filed: Oct. 24, 1988

Related U.S. Application Data

[62] Division of Ser. No. 133,145, Dec. 14, 1987, Pat. No. 4,814,480.

[51] Int. Cl.⁴ .............................................. H01F 7/00
[52] U.S. Cl. .................................... 335/296; 192/84 C
[58] Field of Search ................ 192/84 A, 84 B, 84 C; 335/296, 297

[56] References Cited

U.S. PATENT DOCUMENTS

| | | |
|---|---|---|
| 3,088,567 | 5/1963 | Fischer et al. .................... 192/84 C |
| 3,149,705 | 9/1964 | Shoquist ............................. 192/84 C |
| 4,187,939 | 2/1980 | Silvestrini et al. ................ 192/84 C |
| 4,317,023 | 2/1982 | Gryskiewicz ................ 219/121 LN |
| 4,413,717 | 11/1983 | Kanamaru et al. ............... 192/84 C |
| 4,625,093 | 11/1986 | Chryssolouris ............... 219/121 LJ |
| 4,635,774 | 1/1987 | Sekiguchi et al. ............ 192/84 C X |
| 4,685,202 | 8/1987 | Booth et al. ........................... 29/607 |

Primary Examiner—George Harris
Attorney, Agent, or Firm—Leydig, Voit & Mayer, Ltd.

[57] ABSTRACT

A method of forming slots in the coupling disc (e.g., the armature or rotor) of an electromagnetic coupling such as a clutch or brake. The method is carried out by effecting relative movement between the coupling disc and a laser beam in such a manner as to cause the beam to trace the perimeter of the slot to be formed and to cut a slug of material from the disc. Also disclosed are coupling discs in which opposing side walls of the slots converge toward one another and in which the side walls are concentric but obliquely inclined.

8 Claims, 2 Drawing Sheets

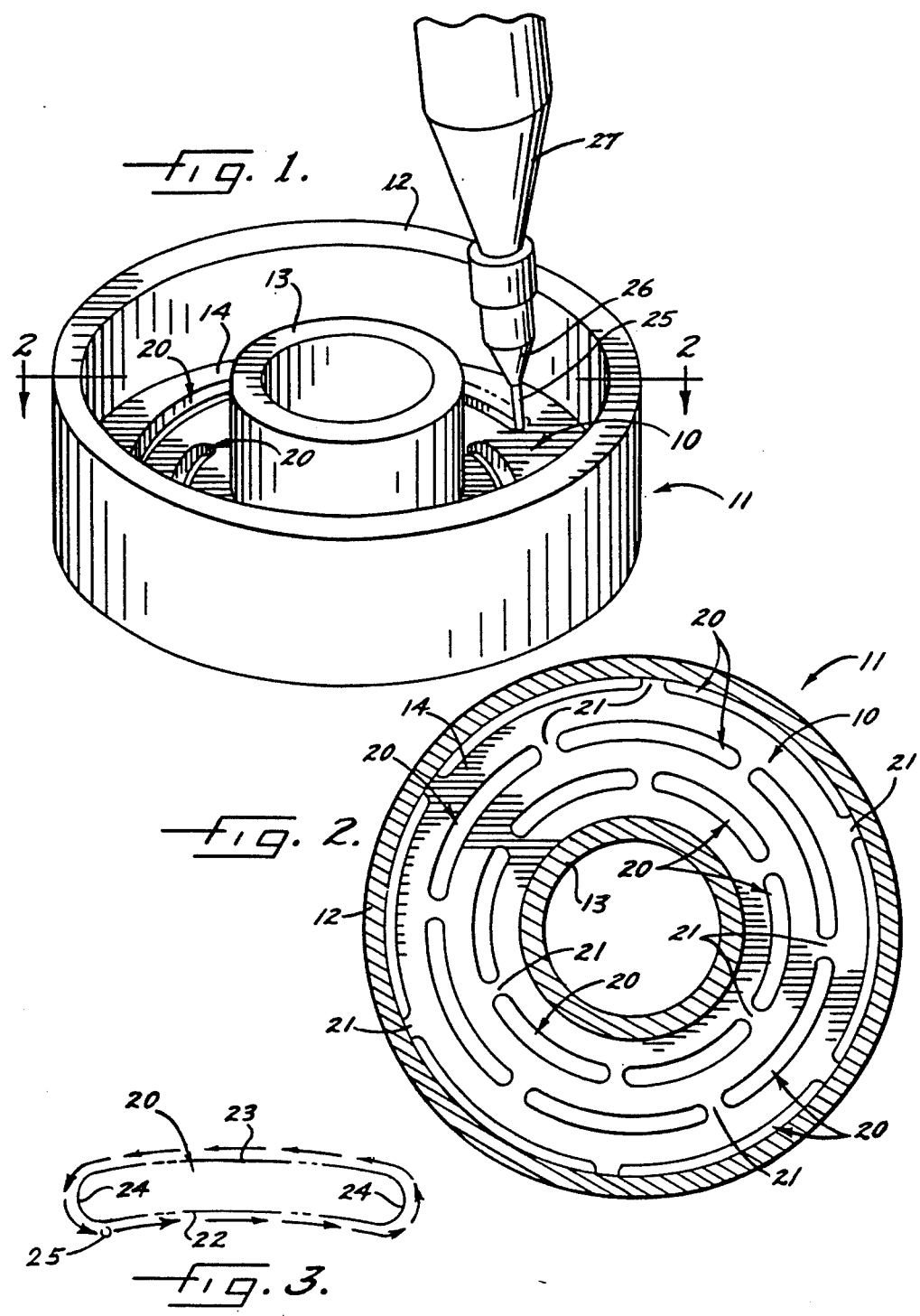

ELECTROMAGNETIC COUPLING DISC

This is a division of Ser. No. 133,145, filed Dec. 14, 1987, now U.S. Pat. No. 4,814,480.

BACKGROUND OF THE INVENTION

This invention relates to multiple pole coupling discs of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of magnetic material such as steel and having a field with a rotary coupling disc or rotor which also is made of magnetic material. When the coil of the field is excited, magnetic flux threads a path between the rotor and the axially opposing armature and attracts the armature into engagement with the rotor to couple the two for rotation in unison.

In the coupling disclosed in the Silvestrini et al patent, the armature is formed with a ring of angularly spaced "banana" slots while the rotor is formed with two concentric rings of angularly spaced banana slots located on opposite sides of the ring of slots in the armature. The banana slots form high reluctance air gaps causing the rotor and armature to define four magnetic poles which increase the torque of a coupling of given diameter. By forming an additional ring of slots in each of the rotor and armature, the coupling may be constructed as a six-pole coupling with even higher torque capacity.

Until just recently, the banana slots conventionally have been stamped in the rotor and armature. Presently available stamping techniques dictate that, as a general rule, the radial width of the slots cannot be substantially less than approximately ¾ the thickness of the disc. As a result, difficulty is encountered in stamping multiple rings of slots in a comparatively thick disc which is relatively small in diameter. In addition, stamping of the slots leaves burrs at the edges of the slots and tends to impose restrictions on the location of the slots in the disc. The design of the disc thus tends to be dictated by tooling considerations rather than magnetic characteristics.

As an alternative to slotting the rotor and armature to form high reluctance air gaps, channels may be machined in the disc and then filled with non-magnetic material to define high reluctance barriers between the poles. Subsequently, the disc is machined to remove the bottoms of the magnetic channels and eliminate the flux leakage paths which otherwise would be created across the bottoms of the channels. This manufacturing process is relatively expensive and becomes even more so when each disc is formed with two or more high reluctance rings.

Formation of the slots in a coupling disc through the use of a laser beam is disclosed in commonly assigned and copending Booth et al U.S. Pat. No. 4,685,202. In the method disclosed in that application, the laser beam forms continuous slots which are immediately backfilled with non-magnetic material. Alternatively, the method contemplates the formation of angularly spaced banana slots separated by non-magnetic bridges which are formed by backfilling the spaces between the slots with non-magnetic material.

The methods disclosed in the aforementioned Booth and Cory application represent remarkable improvements in the art of magnetic coupling discs. Even those methods, however, have some limitations. For example, the formation of slots of any substantial radial width requires the use of a very powerful laser having a beam of substantial diameter. In addition, backfilling of the slots or portions thereof imposes some restriction on the cross-sectional shape and/or the orientation of the slots.

SUMMARY OF THE INVENTION

The general aim of the present invention is to provide a new and improved method of forming a magnetic coupling disc through the use of a laser which, while being of comparatively low power, is capable of cutting relatively wide slots in the disc.

Another object of the invention is to provide a method for easily forming tapered or angled slots through the coupling disc in order to tailor the magnetic characteristics of the disc.

Still another object is to provide a method for forming slots in the coupling disc in locations which were previously impossible to slot on a high production basis.

A more detailed object is to achieve the foregoing by effecting relative movement between the disc and the laser in such a manner as to cause the laser beam to trace the perimeter of the slot to be formed and to form the slot by cutting a slug of material from the disc.

An important object of the invention is to provide magnetic coupling discs having slots with obliquely slanted walls which cause modulation of the dynamic torque capacity of the coupling as the coupling wears in.

These and other objects and advantages of the invention will become more apparent from the following detailed description when taken in conjunction with the accompanying drawings.

BRIEF DESCRIPTION OF THE DRAWINGS

FIG. 1 is a perspective view showing one type of coupling disc being slotted by the new and improved method of the present invention.

FIG. 2 is a cross-section taken along the line 2—2 of FIG. 1.

FIG. 3 is a schematic plan view showing a slot being formed by the method of the present invention.

DETAILED DESCRIPTION

Figure 4:
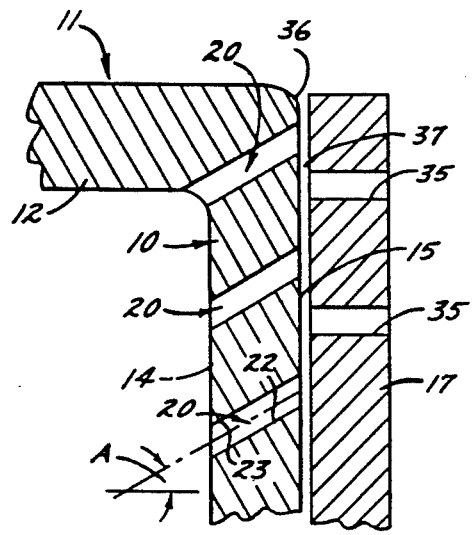
FIGS. 4, 5 and 6 are cross-sectional views of three different types of coupling discs formed by the method of the present invention.

The drawings illustrate the method of the present invention as being used for forming a coupling disc 10 for use in an electromagnetic coupling such as an electromagnetic brake or clutch. While the disc could be an armature, it herein is shown as forming part of a clutch rotor 11 which may, for example, be of the type disclosed in the aforementioned Silvestrini et al patent. In this particular instance, the rotor is circular in shape and includes an axially extending outer flange 12 and an axially extending inner hub 13 which preferably are integral with one face 14 (FIG. 4) of the disc 10. The opposite face 15 of the disc forms the working face of the rotor 11 and is adapted to frictionally engage the armature 17 of the clutch. As is conventional, the rotor is made of low reluctance magnetic material such as AISI 1010 steel.

The specific rotor 11 which has been illustrated in FIGS. 1 to 4 forms part of a six-pole clutch and thus the disc 10 includes three concentric rings of barriers 20 which are non-magnetic. In this instance, the non-magnetic barriers are defined by radially spaced rows or rings of angularly spaced slots. One magnetic pole is defined by that area of the disc located inside of the inner ring of slots, two poles are defined by the area between the inner ring and the middle ring, two additional poles are defined by the area between the middle ring and the outer ring, and the sixth pole is defined by the area located outwardly of the outer ring.

The slots 20 of each ring are separated from one another by angularly spaced magnetic bridges 21 which are left between the slots in order to maintain the structural integrity of the disc 10. Each slot is commonly referred to as being a "banana" slot insofar as each slot is shaped so as to have an elongated and arcuate inner side 22 (FIG. 3), an elongated and concentric outer side 23 and two radiused ends 24.

In accordance with one aspect of the present invention, the slots 20 are formed in the disc 10 by a laser beam 25 which traces around the perimeter of each slot and forms the slot by cutting a slug of steel from the disc. As a result of the laser beam cutting around the perimeter of the slot, relatively wide slots may be formed with a laser beam of comparatively small diameter and, in addition, the radiused ends 24 of the slots may be precisely shaped and formed.

FIG. 3 schematically shows one method of forming each slot 20. The laser beam 25 has been shown as being directed downwardly against the non-working face 14 of the disc 10 by a focusing tip 26 (FIG. 1) located at the lower end of a laser head 27, although the beam could be directed toward the working face 15. The rotor 11 and the laser head are adapted to be moved relative to one another in such a manner as to cause the beam 25 to trace around the perimeter of each slot 20 as shown in FIG. 3 and, in this particular instance, such relative movement is effected by physically shifting the laser head 27. It will be understood, however, that the laser head 27 could be held in a fixed position and that the rotor 11 could be moved in such a manner as to cause the beam 25 to trace the slot 20.

While the cut could be started at any given location along the slot 20, it may be assumed simply for purposes of explanation that the cut is started at one end of the inner side margin 22 of the slot. Thus, the beam is moved in an arcuate path in one direction along the inner side margin 22 and, upon reaching the other end of such side margin, is moved generally radially outwardly but in a curved path so as to form one radiused end 24 of the slot. Thereafter, the beam is moved reversely in an arcuate path along the outer side margin 23 of the slot. The cut is completed by moving the beam generally radially inwardly in a curved path to the point of beginning so as to form the other radiused end 24 of the slot.

The laser generator is of relatively low power and produces a focused beam 25 having a very small diameter in the neighborhood of 0.010" to 0.020". Thus, the cut which the laser makes along the side margins 22 and 23 and the ends 24 of the slot 20 is very narrow. For the perimeter cutting to be effective, the slot should have a radial width of at least 0.050" in order to prevent the laser beam 25 from overly heating and deforming one side margin of the slot while the beam is cutting along the other side margin of the slot. Of course, the maximum width of the slot is virtually unlimited as a result of the beam cutting around the perimeter of the slot rather than forming the slot with a single pass. When the slot has a width of 0.050" or greater, a slug of metal is produced and falls from the disc 10 at or near the completion of the cut. In some instances, the slug may be so small that it is consumed during the cutting process.

Perimeter cutting of the slots 20 not only enables the use of a lower powered laser but also enables the radiused ends 24 of each slot to be formed more precisely than otherwise is the case when the slot is formed by a single pass of the laser. The movement of the narrow beam around the ends of the slot can be accurately controlled so that the ends are cut cleanly. The clean cuts at the ends of the slots reduce the danger of the bridges 21 failing prematurely under fatigue stress. As a result of the more nearly perfect ends 24, the bridges 21 may be formed so as to have a narrower circumferential dimension, thereby reducing the leakage of flux through the bridges and reducing the weight of the rotor 11. Slots with substantially straight ends also can be formed by the present method.

The slotting method as disclosed above enables the creation of unique coupling discs 10 whose magnetic characteristics may be tailored in ways which could not previously be achieved on a high speed basis. By way of example, FIG. 4 shows a cross-section of a six-pole rotor 11 having a circular coupling disc 10, having an axially extending outer flange 12 and adapted to coact with an armature disc 17 which, in this instance, is formed with three rows of angularly spaced banana slots 35 whose axially extending centerlines are parallel to the axis of the rotor and armature.

In keeping with the invention, the banana slots 20 of the rotor 11 are cut with the laser beam at oblique angles (e.g., an angle A of between 10 and 30 degrees) relative to the axis of the rotor as shown in FIG. 4. The inner and outer side walls 22 and 23 of the slots are concentric but are inclined at oblique angles A. As a result of the inclined rotor slots 20, the radial distance between each rotor slot and the adjacent armature slot changes as the rotor disc 10 wears in and the width of the air gap between the rotor disc and the armature 17 increases. This produces a change in the effective radial width of the magnetic poles and enables modulation of the dynamic torque of the clutch as the clutch wears in.

FIG. 4 also illustrates an important advantage of forming the slots 20 with a laser cutting process. As shown, the slots 20 of the outermost row extend directly through the junction between the disc 10 and the flange 12. This enables a pole face 36 to be located outwardly of the junction between the disc 10 and the flange 12 and, more importantly, enables the next pole face 37 to be located immediately adjacent the junction. As a result, a disc of relatively small diameter may be formed with a comparatively large number of poles.

Figure 5:
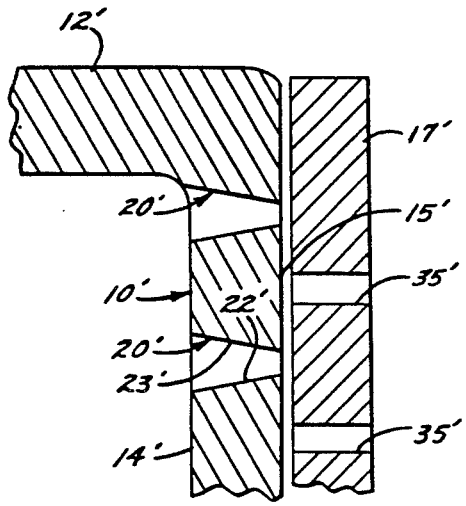

A preferred disc 10' for effecting torque modulation as an incident to wear in is shown in FIG. 5. In this instance, each of the slots 20' includes inner and outer walls 22' and 23' which are inclined at oblique angles so as to converge symmetrically toward one another as the slot progresses from the non-working face 14' of the disc toward the working face 15' thereof. By virtue of this arrangement, the slots 20' increase in radial width while the pole faces between the slots decrease in radial width as the disc 10' wears and the air gap between the disc and the armature 17' becomes wider. This modulates the torque of the clutch so as to reduce the tendency of the torque to overshoot during initial impact of the armature against the rotor disc. FIG. 5 also shows that the slots 20' of the outer row are located closely adjacent the junction of the disc 10' and the flange 12' this location being possible as a result of the slots being cut by a laser rather than being stamped. In this instance, the laser beam is directed toward the working face 15' of the disc 10' and causes the slots to be formed with the tapered cross-section since the laser beam 25 tends to remove more material from the working face 15' than from the non-working face 14'.

Figure 6:
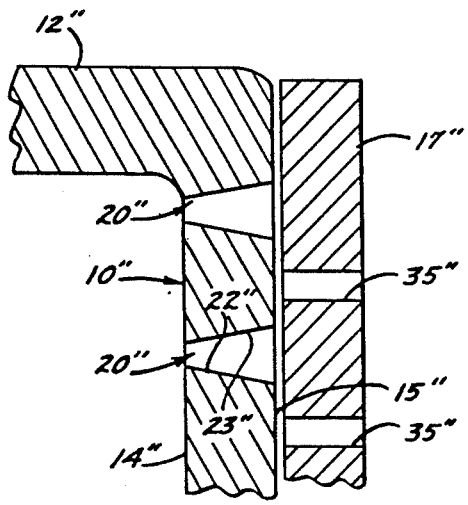

The slots could taper reversely as shown in FIG. 6 in which the side walls 22" and 23" of the slots 20" converge toward one another upon progressing from the working face 15" of the disc 10" to the non-working face 14". Such an arrangement also enables the dynamic torque of the clutch to change as the clutch wears in and usually will be formed by directing the laser beam toward the non-working face 14" of the disc 10".

We claim:

1. A multiple pole coupling disc for an electromagnetic coupling, said disc being made of magnetic material and having a central axis, through slot means formed through said disc, said through slot means being open across the entire thickness of the disc and defining high reluctance air gaps, said through slot means being defined by walls which are inclined obliquely relative to said central axis across the entire thickness of said disc.

2. A multiple pole coupling as defined in claim 1 in which said slot means are defined by radially spaced rows of angularly spaced through slots.

3. A multiple pole coupling as defined in claim 2 in which the obliquely inclined walls of each slot are substantially concentric with one another.

4. A multiple pole coupling as defined in claim 2 in which the obliquely inclined walls of each slot continuously converge toward one another.

5. A multiple pole coupling as defined in claim 4 in which said disc includes a working face and a non-working face, the walls of each slot converging toward one another as the walls progress from said working face to said non-working face.

6. A multiple pole coupling as defined in claim 4 in which said disc includes a working face and a non-working face, the walls of each slot converging toward one another as the walls progress from said non-working face to said working face.

7. A multiple pole coupling as defined in claim 2 further including an axially extending flange formed integrally with the outer periphery of said disc, the slots of the outermost row of slots extending through said disc substantially at the junction of said disc with said flange.

8. A multiple pole coupling as defined in claim 7 in which the obliquely inclined walls of each slot of said outermost row are substantially concentric with one another.

* * * * *